A. B. LANDIS.
CHANGE SPEED GEARING.
APPLICATION FILED MAY 31, 1913.
1,187,849.
Patented June 20, 1916.
12 SHEETS—SHEET 2.
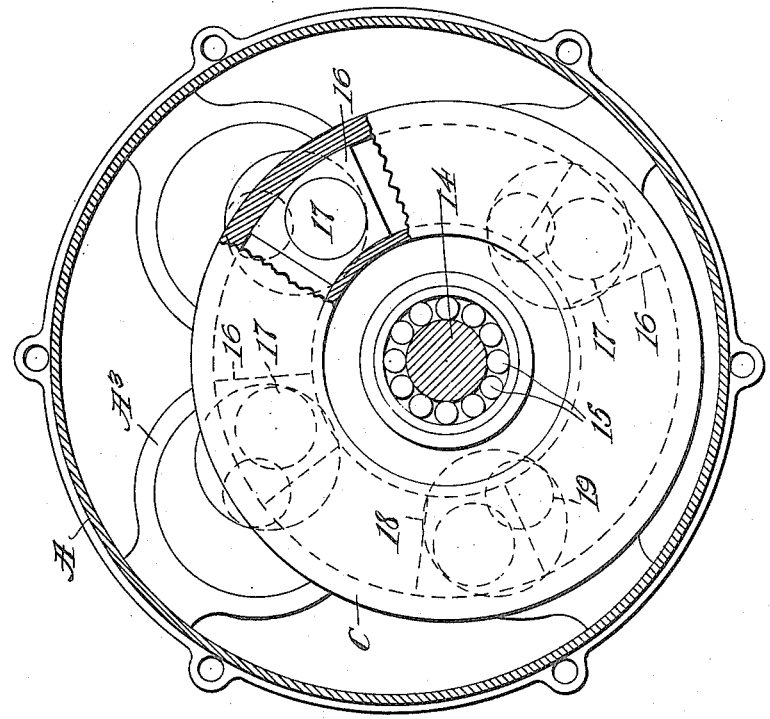
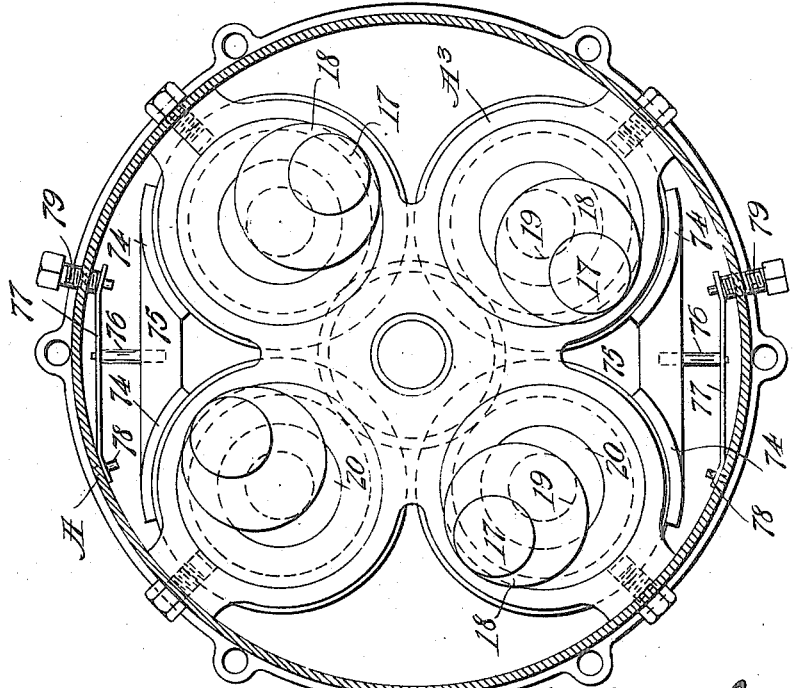
Witnesses
E. J. Clements
J. A. Braddock
Inventor
Abraham B. Landis
By Bradford & Doolittle,
Attorneys

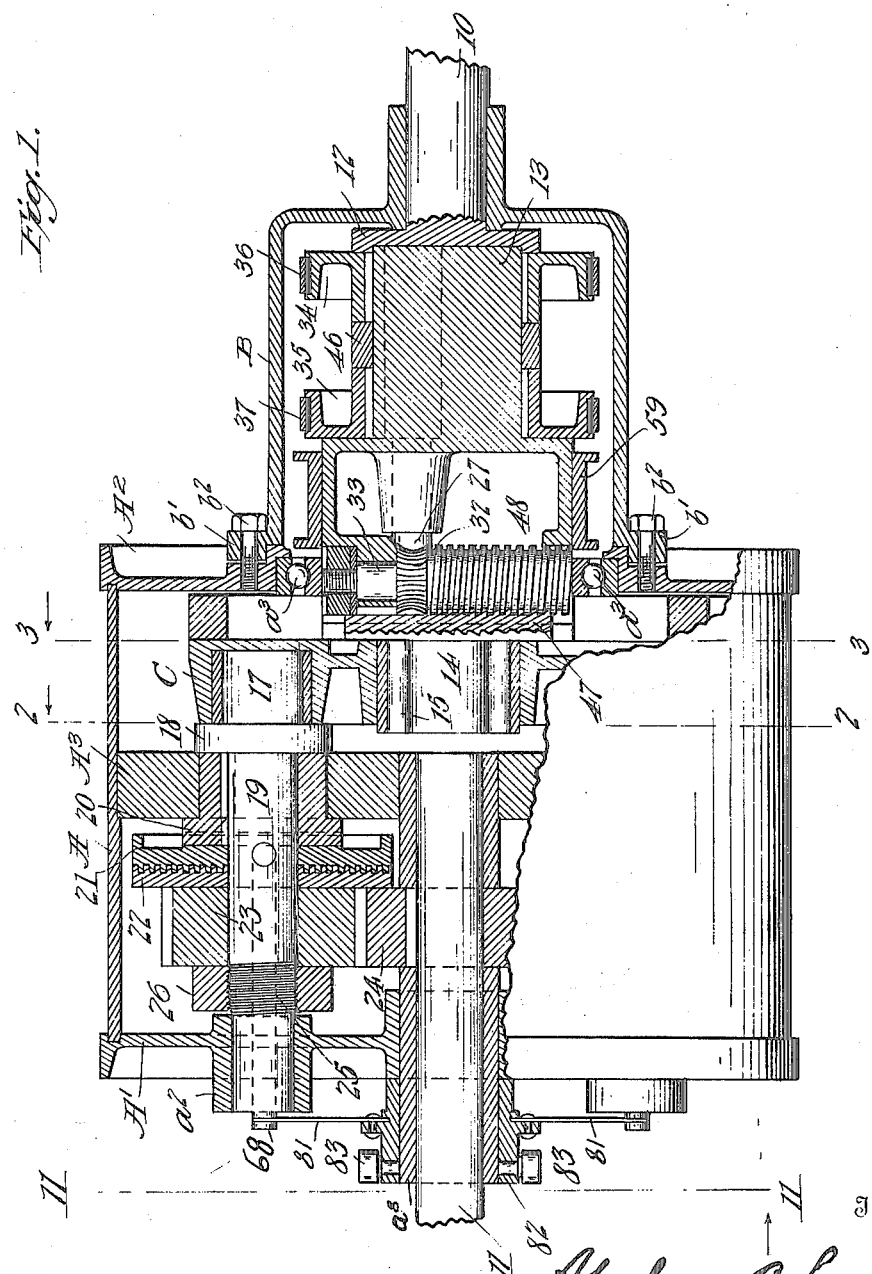

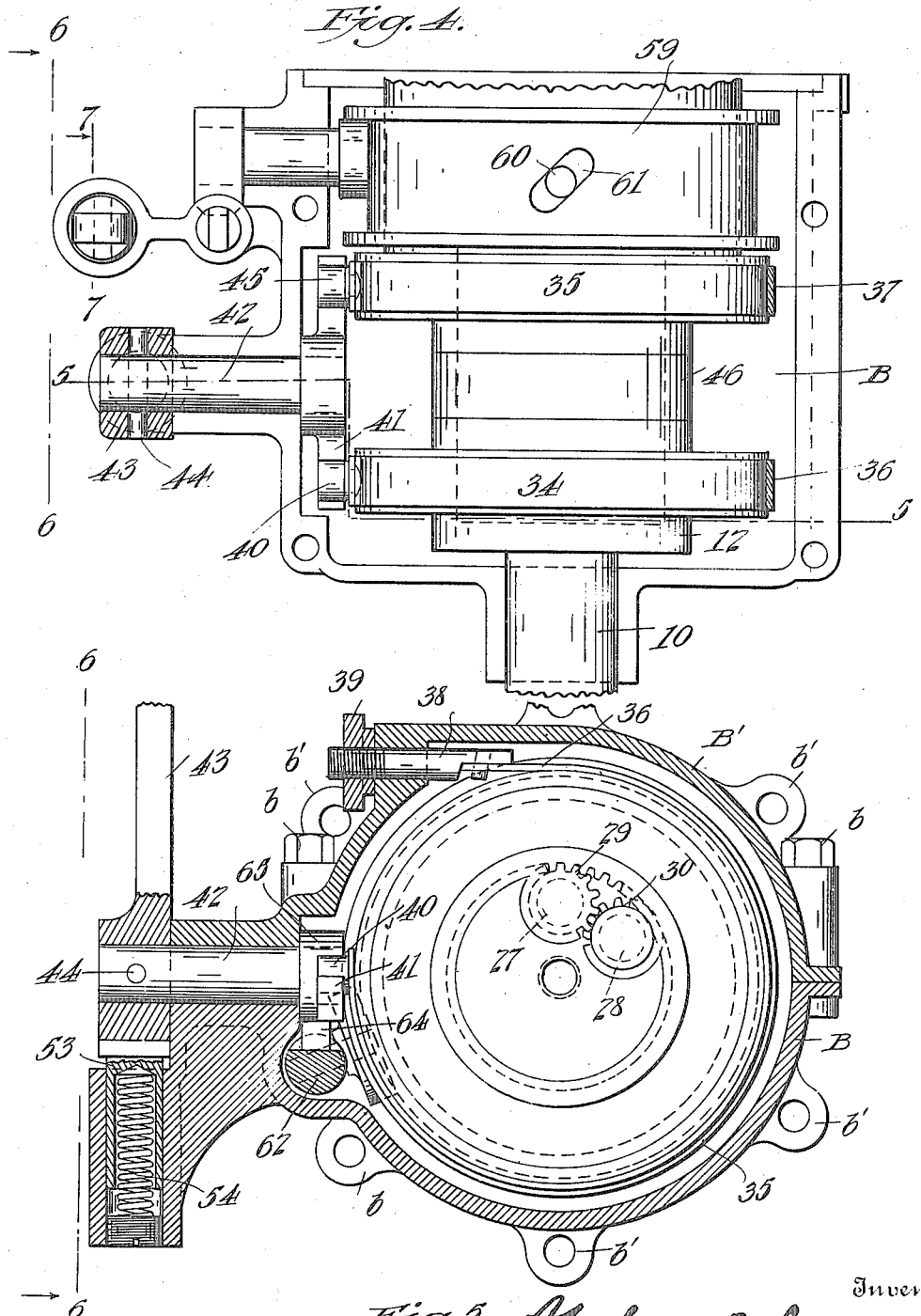

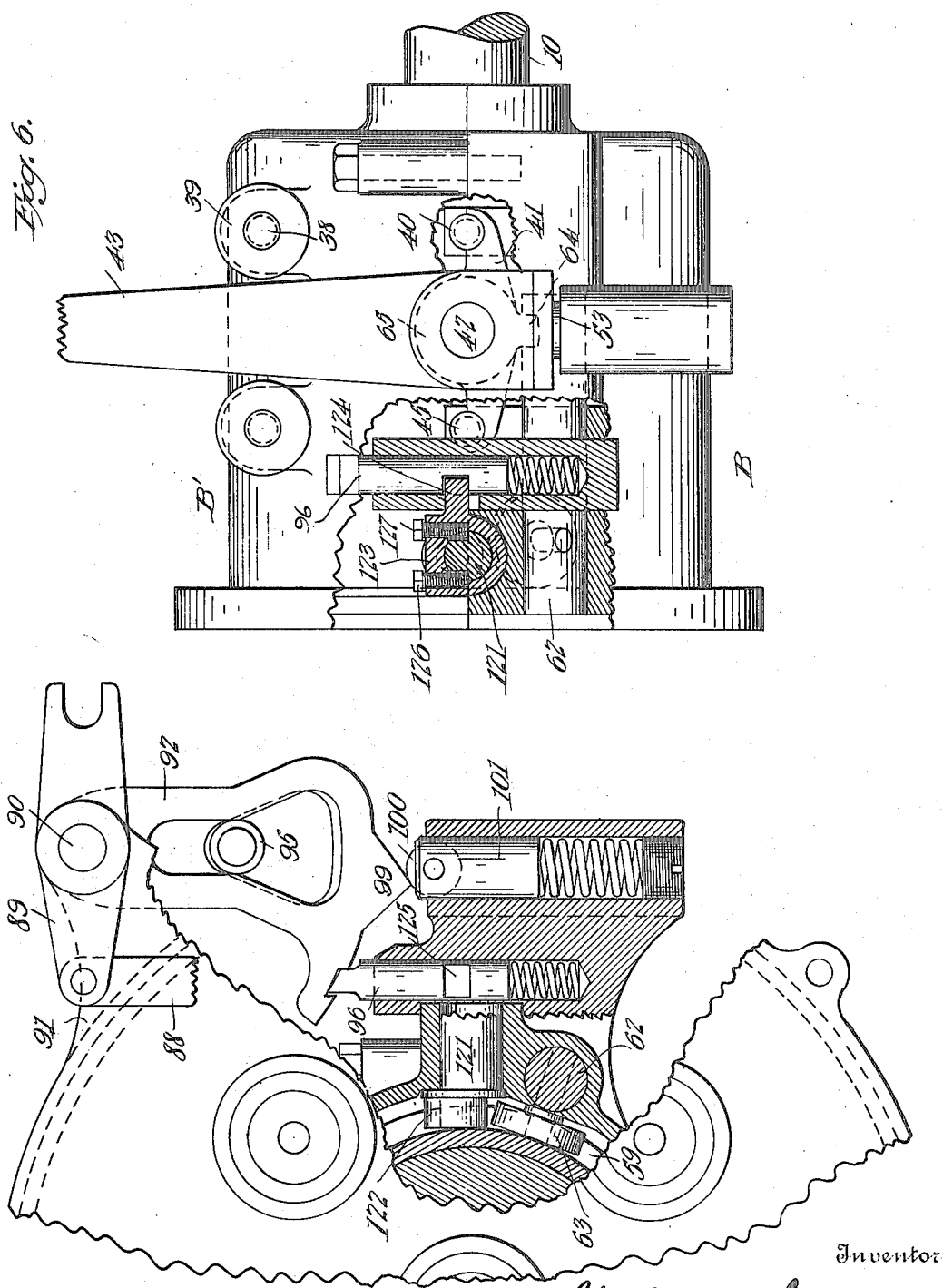

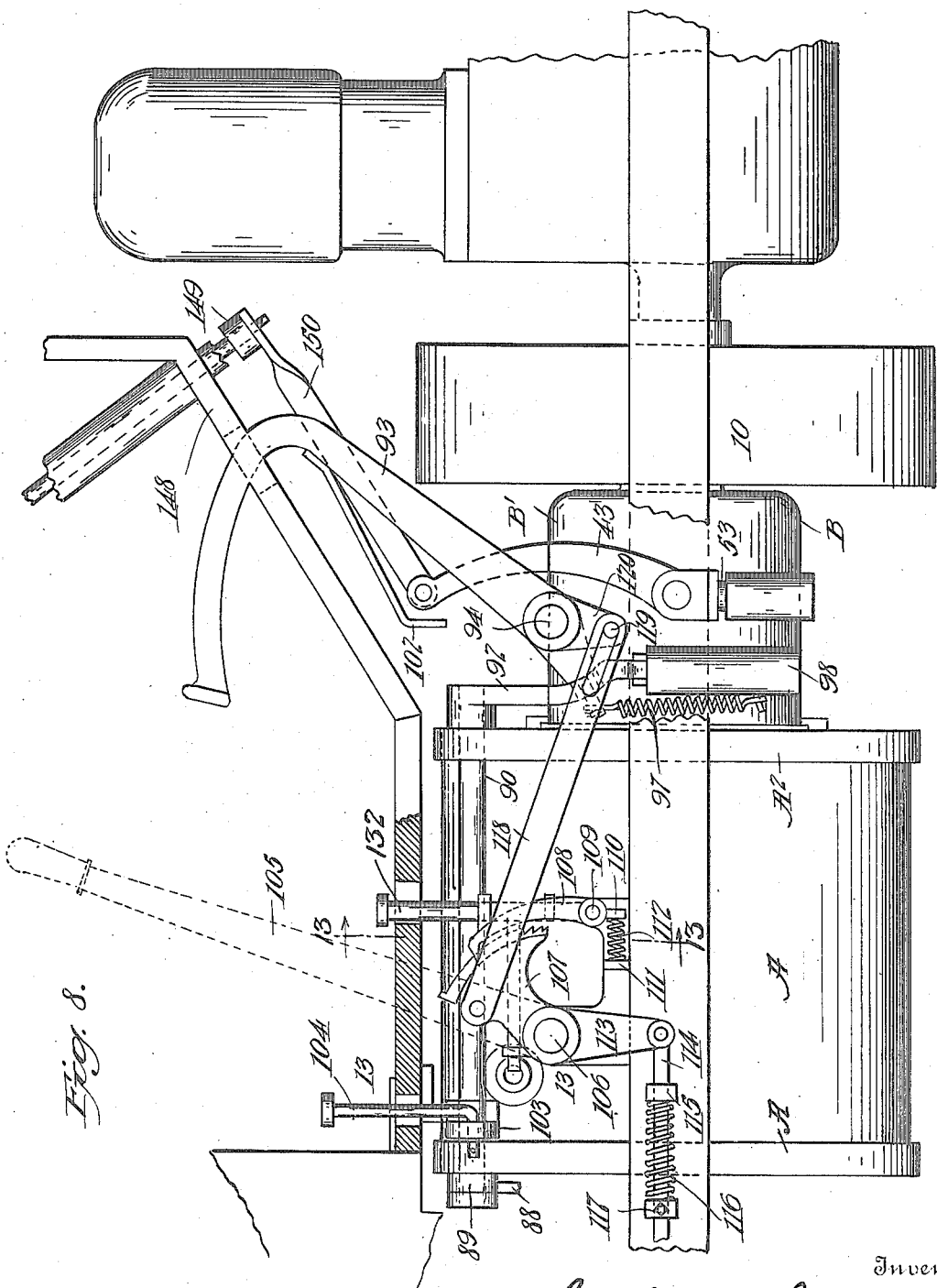

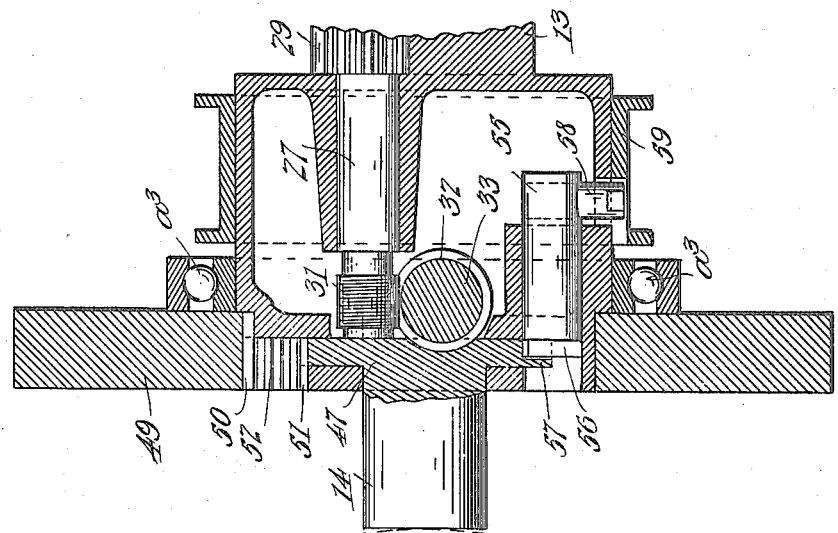
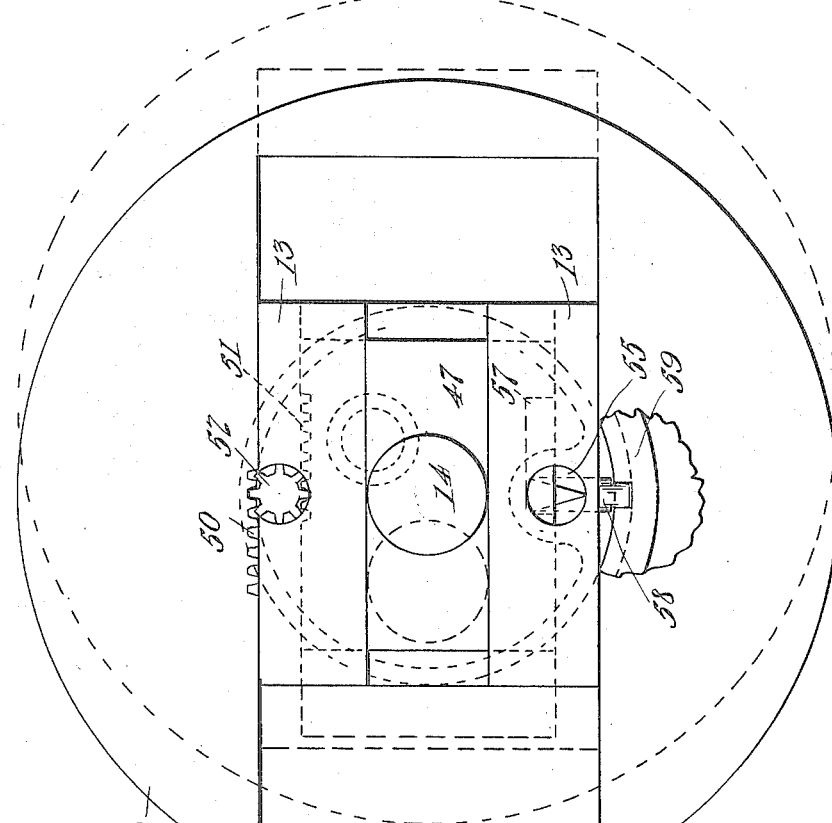

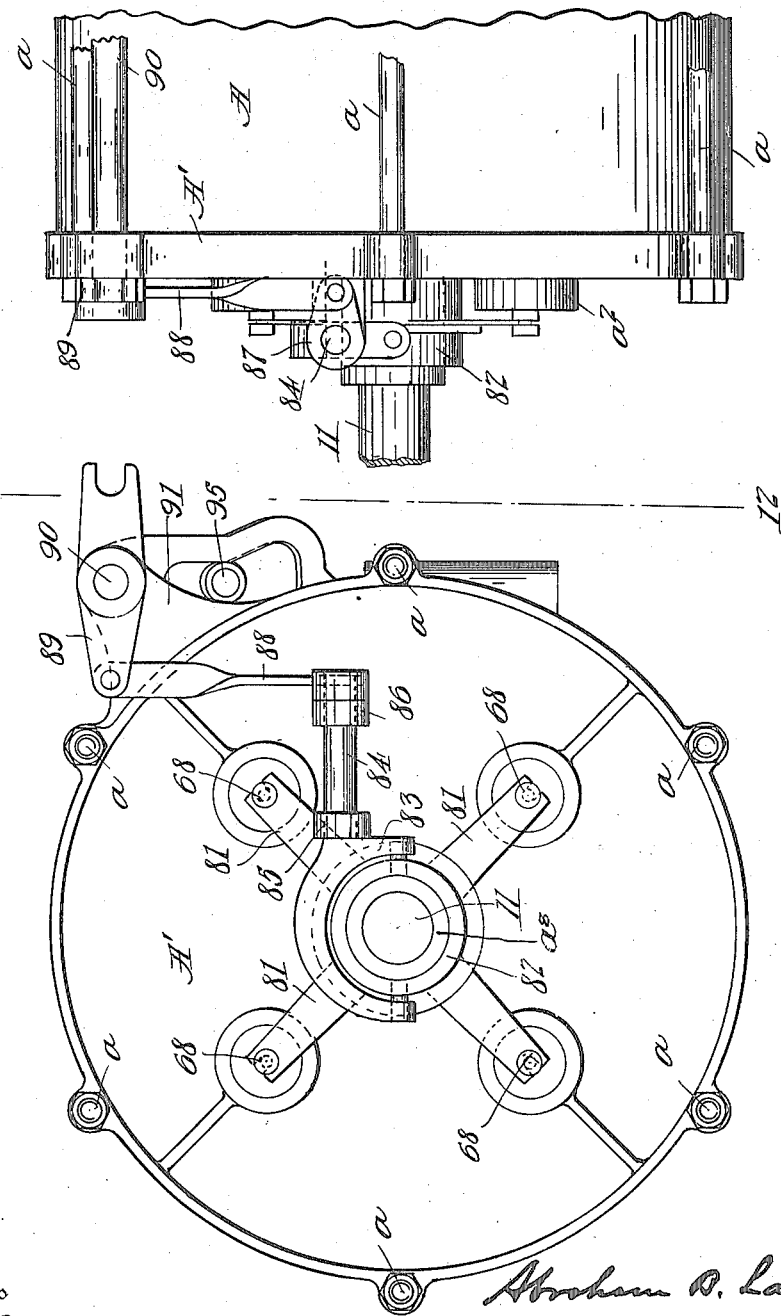

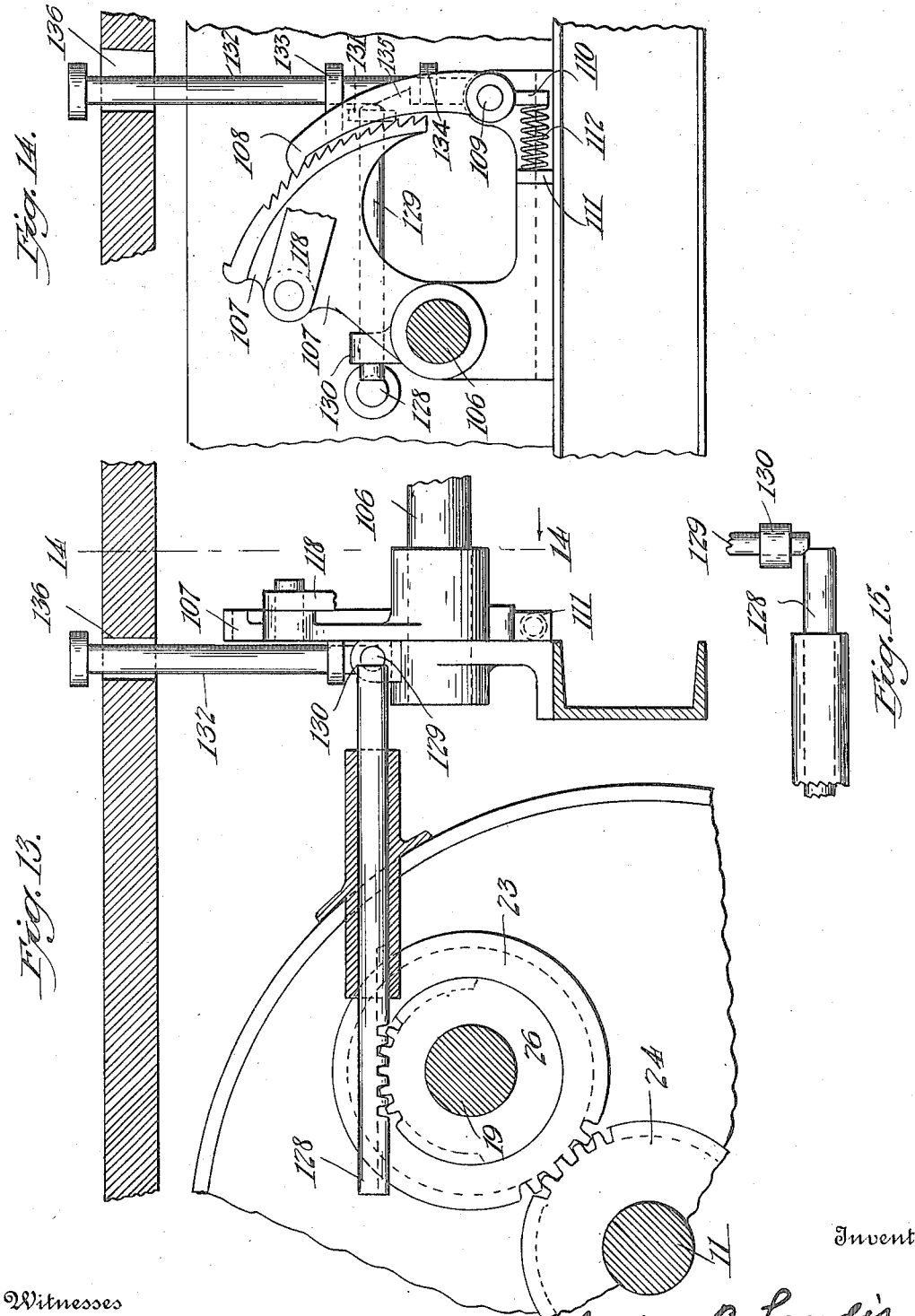

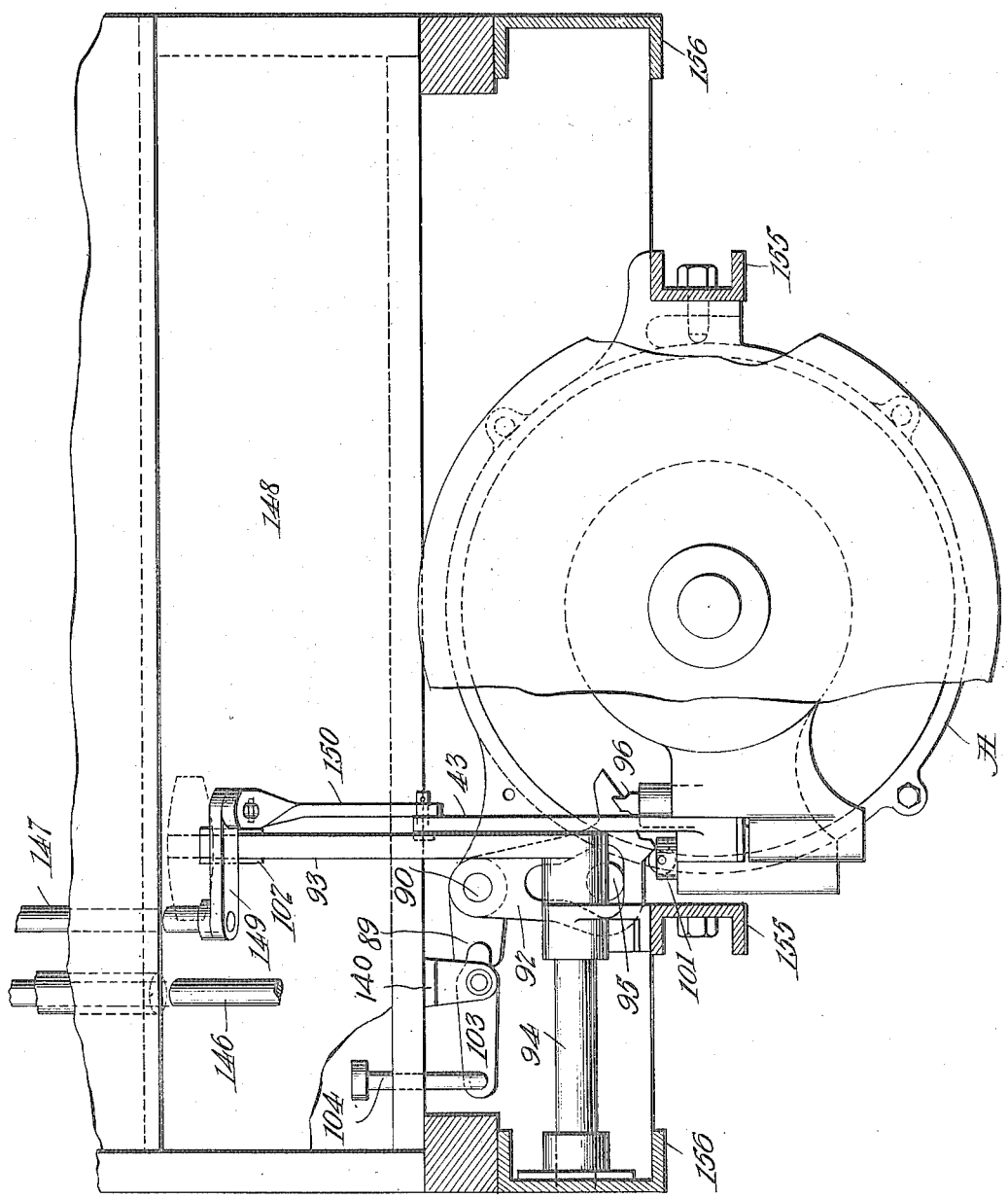

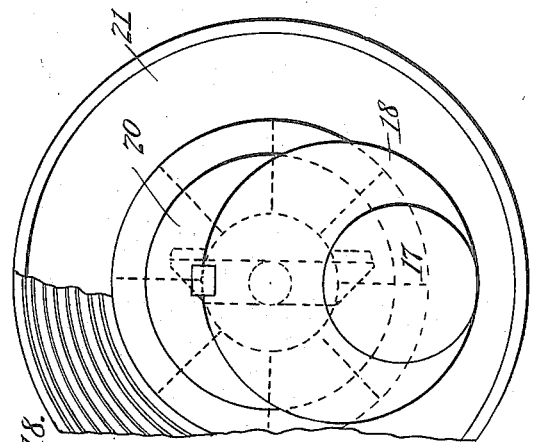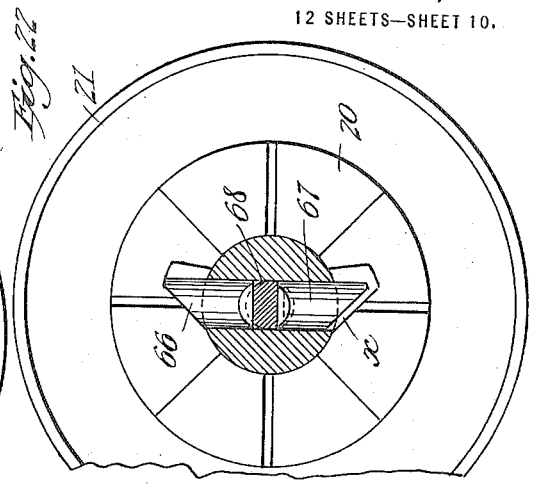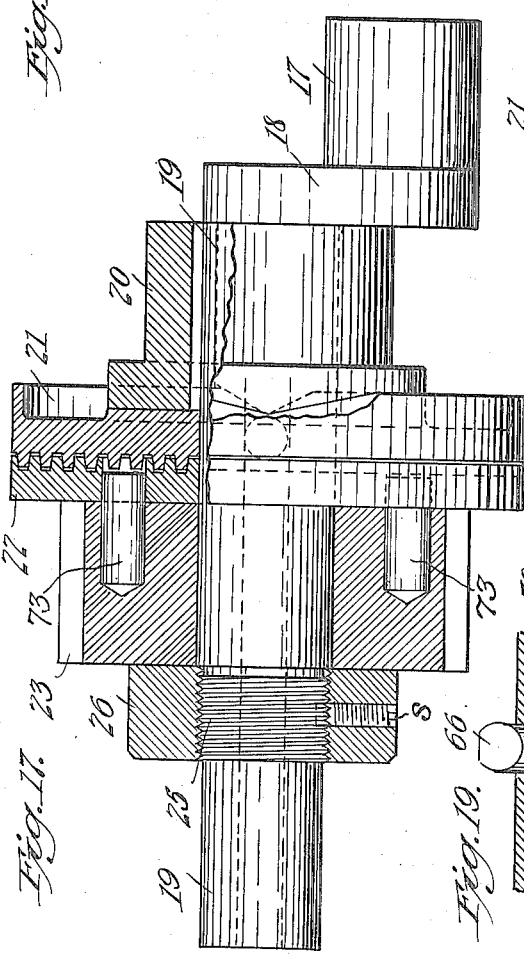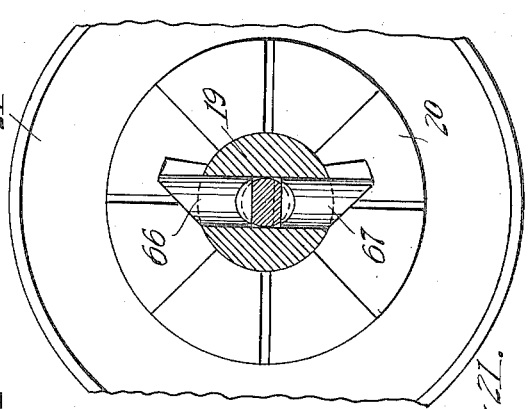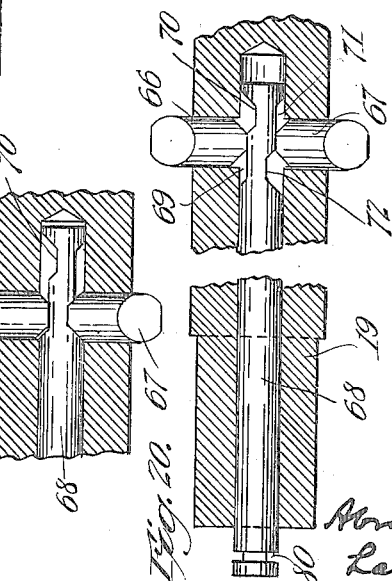

A. B. LANDIS.
CHANGE SPEED GEARING.
APPLICATION FILED MAY 31, 1913.

1,187,849.

Patented June 20, 1916.
12 SHEETS—SHEET 11.

Witnesses
E. J. Clements
J. A. Braddock

Inventor
Abraham B. Landis,
By Bradford & Doolittle,
Attorneys

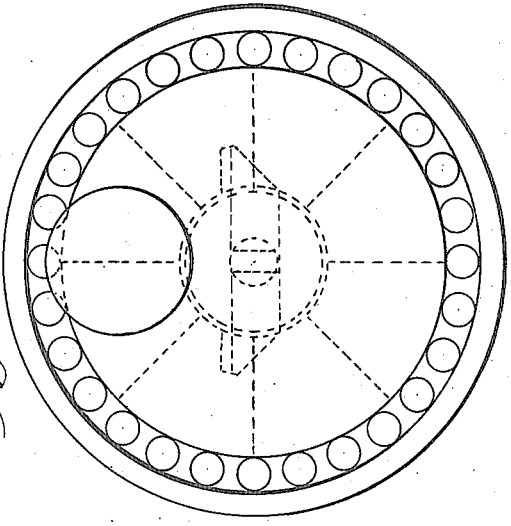
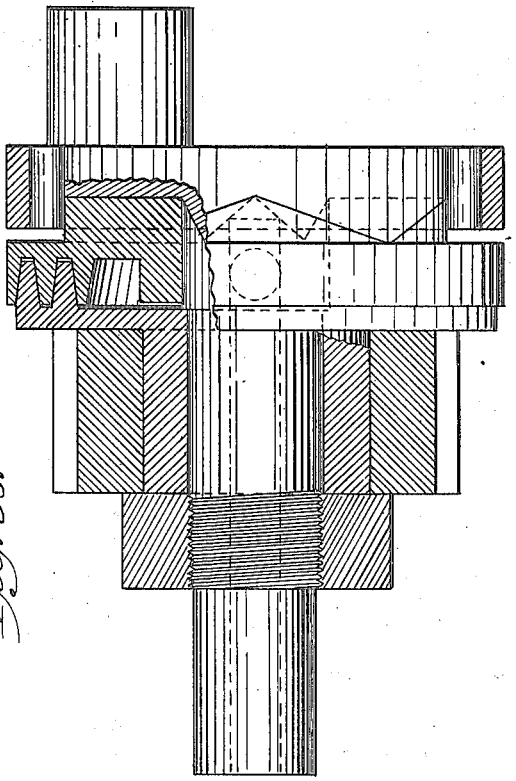
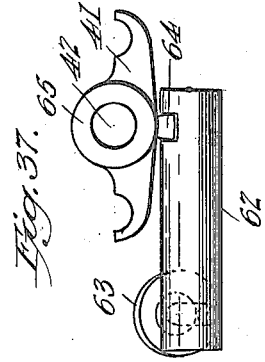
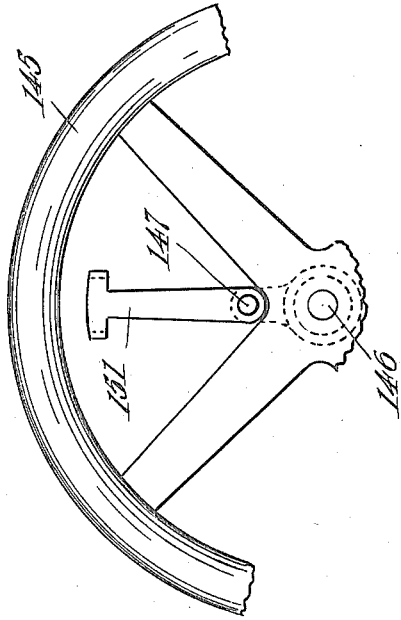

UNITED STATES PATENT OFFICE.

ABRAHAM B. LANDIS, OF ENFIELD, PENNSYLVANIA.

CHANGE-SPEED GEARING.

1,187,849.  Specification of Letters Patent.  Patented June 20, 1916.

Application filed May 31, 1913. Serial No. 771,109.

*To all whom it may concern:*

Be it known that I, ABRAHAM B. LANDIS, a citizen of the United States, residing at Enfield, Montgomery county, and State of Pennsylvania, have invented and discovered certain new and useful Improvements in Change-Speed Gearing, of which the following is a specification.

My present invention consists in an improved construction of automobile transmission gearing, wherein the object is to provide a change speed transmission gear by which sudden shocks in starting, stopping and changing from one speed to another, and the resulting strains upon the mechanism, tires, and entire car may be avoided, and a gear provided by which the speed of the driven part can be regulated, or continuously varied, from zero—or no-motion—to the highest speed desired, both forward and backward.

The particular objects of the present invention are to provide such a gearing of a comparatively simple and inexpensive construction, but one which will be positive in its action, easily controlled, comparatively noiseless and at the same time efficient and durable, all as will be hereinafter more fully described and claimed.

Figure 23:
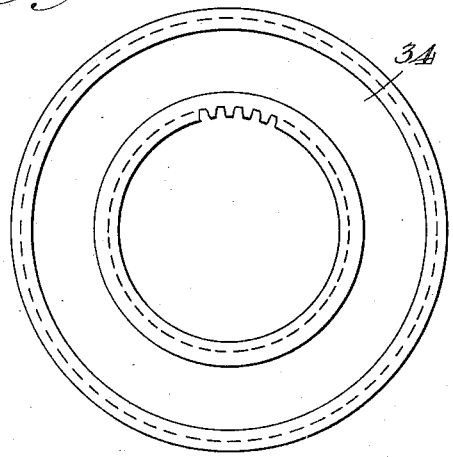
Figure 24:
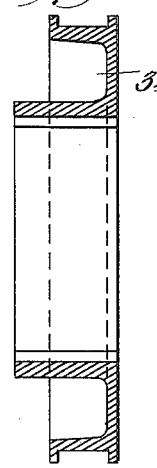
Figure 25:
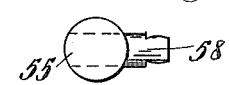
Figure 26:
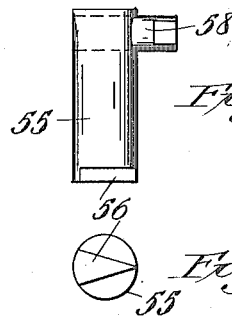
Figure 27:
Figure 28:
Figure 30:
Figure 29:
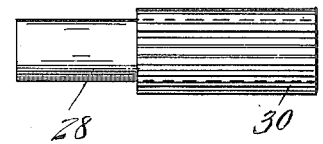
Figure 31:
Figure 35:
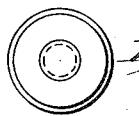
Figure 32:
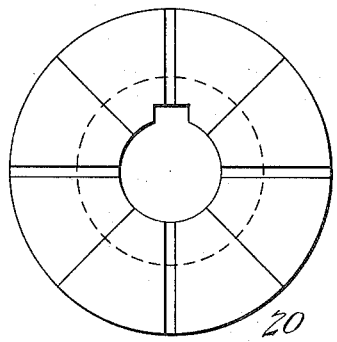
Figure 33:
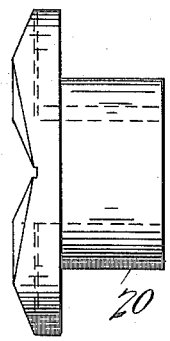
Figure 34:
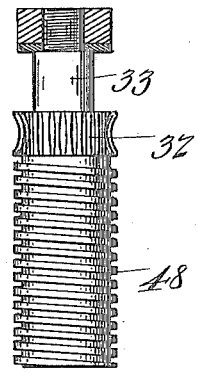

Referring to the accompanying drawings which are made a part hereof, and on which similar reference characters indicate similar parts, Figure 1 is chiefly a central longitudinal section through the gear, the lower side of the casing being shown in elevation, Fig. 2 a cross section looking in the direction indicated by the arrows from the dotted line 2—2 in Fig. 1, Fig. 3 a section looking in the direction indicated by the arrows in the dotted line 3—3 in Fig. 1, Fig. 4 a top or plan view of the driving end of the gear, the top half of the inclosing casing being removed, Fig. 5 a cross section on the dotted line 5—5 in Fig. 4, Fig. 6 a front elevation as seen when looking in the direction of the arrows from the dotted line 6—6 in Figs. 4 and 5 with a portion of the casing broken away and parts shown in section, some of the interior parts shown in section to illustrate their construction and operation more clearly, Fig. 7 a detail section on the dotted line 7—7 in Fig. 4, Fig. 8 a side elevation illustrating the gear as mounted on an automobile, Fig. 9 a detail front elevation of the parts shown in Fig. 10, Fig. 10 a central section on the dotted line 10—10 in Fig. 9, Fig. 11 an end elevation as seen when looking in the direction indicated by the arrows from dotted line 11—11 in Fig. 1, Fig. 12 a detail side elevation of the front end of the gear casing as seen when looking in the direction of the arrows from the dotted line 12—12 in Fig. 11, Fig. 13 a detail cross section as on the dotted line 13—13 in Fig. 8, Fig. 14 a detail view looking in the direction indicated by the arrows from the dotted line 14—14 in Fig. 13, Fig. 15 a detail view of parts shown in Fig. 13, Fig. 16 an end view showing the gear as mounted on an automobile and the connections with operating levers, Fig. 17 a view partly in section and partly in elevation on an enlarged scale of the oscillating shaft and parts mounted thereon shown at the upper part of Fig. 1, Fig. 18 a detail view of the friction disks illustrating their method of operation, Figs. 19, 20, 21, and 22 are detail views illustrating the means for controlling the friction disk in connection with the oscillating shaft, Figs. 23 and 24 are detail views illustrating the construction of one of the wheels 34 or 35, separately, Figs. 25, 26, and 27 are detail views illustrating the form of the rock shaft 55 shown in Fig. 10, separately, Figs. 28, 29, 30, and 31, are views illustrating the form of shafts 27 and 28, separately, Figs. 32 and 33 are views illustrating the construction of the cam 20, separately, Figs. 34 and 35 are views illustrating the construction of shaft 33, separately, Fig. 36 a detail view showing the controlling lever in connection with the steering gear of the car, Fig. 37 a detail view illustrating more clearly the construction of the sliding rod 62 and connected parts, and Figs. 38 and 39 are views similar to Figs. 17 and 18, showing a somewhat modified form and arrangement of the parts.

In said drawings the portions marked A represent the main casing, preferably cylindrical which is provided with heads $A^1$ and $A^2$, rigidly secured together by clamping screw rods $a$, (Figs. 11 and 12). Secured to the head $A^2$ of the casing A is a smaller casing made in two parts, B and $B^1$, secured together by bolts $b$, (Fig. 5). Said casing is formed with radial ears $b^1$ through which screws or bolts $b^2$ extend into screw-threaded perforations in said head $A^2$ thereby securing the casing B—$B^1$ securely to said head.

10 is the driving shaft, either the engine shaft or a shaft coupled thereto, and 11 is the driven shaft to which the speed or motion is imparted by the mechanism to be described. The shaft 10 extends within the casing B—$B^1$, being journaled in a suitable bearing in its outer end and carries a cupped disk 12 on its inner end which is secured to turn therewith. Said disk is in turn rigidly secured to a housing 13 which carries a transversely slidable crank-pin 14 at its inner end. Said housing is journaled at its inner end by means of ball-bearings $a^3$ in an opening in head $A^2$ provided therefor.

C is a pitman disk mounted on said crank-pin, anti-friction rollers 15 being preferably interposed in said bearing. Said pitman disk has an annular groove in its inner face near its periphery in which are mounted sliding segmental blocks 16. Said blocks are mounted on crank-pins 17 on crank-arms or disks 18 of oscillating shafts 19. Said oscillating shafts 19 are journaled at their outer ends in bearings $a^2$ in the outer disk $A^1$ of casing A and at their inner ends project through the hub of a cam 20 which cam is securely keyed to said shaft adjacent to the disk 18 and is journaled in a suitable bearing in a spider $A^3$ in casing A intermediate of the heads $A^1$ and $A^2$. A friction disk 21 is mounted on said shaft 19 adjacent to said cam 20 and another friction disk 22 is mounted adjacent to said disk 21. Said disk 22 is appropriately secured to a pinion 23 which is adapted to mesh with a pinion 24 on the driven shaft 11. Shaft 19 is formed with a screw-threaded section 25 adjacent to the pinion 23 and a nut 26 is mounted thereon to secure said pinion in longitudinal position and receive any thrust from the operation of the clutch mechanism. Said nut is locked in adjusted position by a transverse set-screw $s$. The connection or the gearing being thus traced from the driving to the driven shaft the details of construction will be now explained.

The change in speed is secured by varying the throw of the pitman disk C. This is accomplished by the mechanism best illustrated in Figs. 1, 4, 5, 9, and 10. The housing 13 on the driving shaft 10 has mounted therein a pair of shafts 27 and 28, illustrated in detail in Figs. 28, 29, 30, and 31. These shafts are journaled in appropriate bearings in said housing and said shaft 27 is formed with a pinion 29 and shaft 28 with a pinion 30 which are of considerable length and the central portions of which overlap and mesh with each other as clearly indicated in Fig. 5. The shaft 27 has a worm 31 formed on its inner end which engages with a worm wheel 32 on a transverse shaft 33 mounted in bearings in the inner end of said housing 13 as will be presently described. A wheel 34 is mounted around said housing adjacent to the disk 12 and formed with internal teeth which mesh with the outer end of pinion 30 on shaft 28. Another wheel 35 is mounted around said housing adjacent to the shoulder at its enlarged inner end with internal teeth meshing with the teeth on the inner end of the pinion 29 on shaft 27. A bank-brake 36 is mounted around wheel 34 and a similar band-brake 37 around wheel 35. Said band-brake 36 is connected at one end to a screw rod 38 which extends through a tangential perforation in the part $B^1$ of the casing and has an adjusting nut 39 on its outer end by which said brake may be accurately adjusted. The opposite end of said band has a radially projecting pin 40 which is adapted to rest in a notch in the upper edge of one end of a double-ended rocker-arm 41 mounted on a rock-shaft 42 which extends outwardly through a bearing between the parts B and $B^1$ of the casing and has a lever 43 secured on its outer end by a key or pin 44. Band-brake 37 is of like construction and has a radial pin 45 which rests in a notch in the opposite end of said rocker-arm 41. A collar 46 is interposed between the hubs of said wheels 34 and 35 to prevent longitudinal movement between the rim of disk 12 at one end and a shoulder or off-set in the housing near its other end. Crank-pin 14 is formed on a base-plate 47, (Figs. 1, 9, and 10), mounted to slide in a transverse way in the inner end of housing 13. Said base-plate 47 is formed with spiral teeth or threads with which a screw 48 on shaft 33 engages. It will thus be seen that as shaft 27 is rotated in one direction or the other, worm 31 will operate through worm gear 32 to rotate shaft 33 which through the screw 48 and its threaded connection with the base-plate 47 will operate to slide said base-plate and throw the crank-pin 14 toward or from a position concentric with the driving shaft 10. A counter-balance disk formed with an appropriate rectangular opening is mounted on the inner end of housing 13 and formed with a short rack 50 on one edge of said opening adjacent to a correspondingly formed rack 51 on the outer edge of the base-plate 47 of the crank-pin 14. A pinion 52 appropriately journaled in the inner end of the housing is interposed between said rack faces engaging with each.

In Fig. 9 the parts are shown with the crank-pin 14 in position concentric with driving shaft 10, or at zero or "no-throw" in whole lines. In such position the disk 49 will be concentric with the crank-pin. In dotted lines said crank-pin is indicated as moved to the "full-throw" position, in which position it will be seen that the counter-balance disk 49 will have been moved in the opposite direction to the movement of said crank-pin. Said counter-balance disk is of a weight equal to the weight of the mechanism moved so that as said mechanism is moved in one direction the counter-balance disk will maintain at all times the equilibrium of the parts and guard against any undue vibration and strain under high speed such as would result from having said parts out of balance.

By referring to Figs. 5 and 6 it will be noted that the lower end of lever 43 is formed with a wide flat lower end against which a spring pressed plunger 53, also formed with a flat end, is adapted to bear, and is held firmly against said face by a stiff coiled spring 54 mounted in a socket on the casing B immediately beneath the lower end of said lever. By this means said lever is normally maintained in an upright position and the rocker-arm 41 in a horizontal position which holds and maintains the brakes 36 and 37 in an "easy" position on the wheels 34 and 35. By throwing lever 43 in one direction the brake 36 will be brought to impinge upon the wheel 34 and lock it from rotation, and when thrown in the other direction the brake 37 will be brought to impinge upon wheel 35 and lock it from rotation. The locking of either wheel will impart motion through the gear connection to one or the other of the shafts 27 and 28. When the shaft 27 is being driven from the wheel 34 it will operate the worm-shaft 33 in one direction and when it is driven from the wheel 35 through the shaft 28 and pinion 30 it will operate it in the reverse direction, as will be readily seen. A short rock-shaft 55 is mounted in a bearing in the inner end of housing 13 and has a triangular shaped inner end 56, the upper corners of which are adapted to be contacted by either end of a recess 57 in the adjacent face of the base-plate 47 of the crank-pin 14 so that as said base-plate reaches either end of its transverse movement said shaft is slightly rocked in one direction or the other. An arm 58 extends outward in a radial direction from the other end of said rock-shaft 55 through a segmental slot in said housing 13 and engages with a longitudinal slot in a flanged ring 59, which ring is mounted around said housing and secured thereto by pins 60, (Fig. 4), extending through diagonal slots 61 in said ring. There are preferably three of said pins and slots disposed equi-distant around said housing. Thus at each limit of the transverse movement of the crank-pin 14 said ring 59 is given a slight longitudinal movement on said housing 13. A rod or bar 62 is mounted to slide longitudinally in a way in the casing B and carries an anti-friction roller 63 on an appropriate inwardly projecting stud which roller engages and operates between the flanges of said ring 59. The other end of said rod 62 is formed with a notch which engages a downwardly projecting finger 64 on a collar 65 secured to the inner end of rock shaft 42. The movement of said rod in one direction or the other, as will be seen, will operate to oscillate rock shaft 42 and operate the band-brakes 36 and 37, for a purpose to be presently more fully described.

Referring now to the mechanism for transmitting the motion from pitman disk C to the driven shaft: there are four of the oscillatory shafts 19 mounted equi-distant from each other and equi-distant from driven shaft 11, as shown most clearly in Figs. 1, 2, and 3, and before described. The crank-pin 17 of each is journaled in one of the segmental blocks 16 mounted in the annular groove near the periphery of said pitman disk C. It will be noted that during each revolution of crank-pin 14 the segmental blocks 16 will successively be traveling in a forward direction and that the oscillating shaft 19 operated thereby will be thus positively driven in the appropriate direction and that when the positive forward drive of one stops it is taken up by a succeeding shaft and that a positive constant drive of shaft 11, through the gearing described, is thus maintained at all times.

The transmission clutches comprising the parts 20, 21, and 22 are illustrated in detail in Figs. 17 to 22 inclusive and also in Figs. 32 and 33. It will be noted that the cam 20 which is securely keyed to the shaft 19 is formed with a double cam face which is adapted to fit against and coöperate with a correspondingly formed adjacent face of disk 21 as indicated most clearly in Figs. 17, 32, and 33. The hub of said disk 21 is formed with radial recesses projecting on opposite sides of its central opening of a form best shown in Figs. 21 and 22. Radially sliding locking pins 66 and 67 are mounted in opposite ends of a transverse perforation extending through shaft 19 with their outer ends resting in said recesses. The inner adjacent ends of said pins 66 and 67 rest upon opposite sides of a sliding rod 68 mounted to slide in a central longitudinal perforation in said shaft 19 and extending somewhat beyond the outer end thereof. Said rod has several cam faces 69, 70, 71, and 72 respectively. By referring to Figs. 21 and 22 it will be noted that the recesses in the hubs of disk 21 are of corresponding form to the ends of the pins 66 and 67, but sufficiently wider to allow said disk a slight oscillating movement when one or the other of said pins is not held outwardly against the face of said recess. By referring to Figs. 20 and 21 the position they occupy when disk 21 is locked from any movement will be seen, the rod 68 being adjusted to position where the cam faces 69 and 71 will hold the pins 66 and 67 respectively at their outward limits so that their outer ends will impinge tightly against the faces of the recesses and hold said disk from any independent oscillatory movement, in which position the friction faces of disks 21 and 22 will be held out of operative contact and no motion transmitted to gear 23 and driven shaft 11 will be at rest. When the pin 67 is released, however, as indicated in Figs. 19 and 22 a slight space $x$, is formed between the inner end of said pin and the face of said recess which will permit the disk 21 to oscillate on shaft 19 slightly in one direction. When pin 66 is in a like manner released by sliding the rod 68 so that said pin will engage with the cam surface 70, a like space will be formed at the other end, and said disk will be permitted to oscillate in the opposite direction. Disk 22 is secured rigidly to the pinion 23 by pins 73, or in any other appropriate manner, and said pinion 23 is mounted normally loose on shaft 19 and held from longitudinal movement by nut 26. The adjacent faces of said disks 21 and 22 are formed with circular engaging friction ribs and grooves slightly tapered and of any number that may be appropriate to secure the highest efficiency. In Figs. 1 and 16 I have shown a number of comparatively small ribs of this character while with the modified construction shown in Fig. 36 I have shown only two of said ribs, but of larger dimensions. The preferred construction will, of course, depend upon the power and the conditions, which constitutes merely mechanical details of construction. The operation of this part of the mechanism is as follows: During the forward or the backward movement of each oscillating shaft 19 the disk 21 thereon is allowed a slight oscillation independent of said shaft and cam 20, which results in said cam 20 forcing said disk into driving engagement with disk 22 and driving shaft 11 in either forward or backward direction according to which direction said disk 21 is thus fixed to oscillate. The oscillating motion being imparted to shaft 19 through the connection of its crank 17 with the pitman disk C appropriate pins 66 or 67 being set to free disk 21 to oscillate in the direction necessary for the desired motion, the cam face on cam 20 will slide said disk into engagement with the friction surfaces on the face of disk 22 and operate pinion 23 in the appropriate direction transmitting the motion to the driven shaft 11. When the clutch member 21 is locked from oscillating in one direction it is prevented from engaging in that direction with the disk 22 and when the oscillation of shaft 19 reaches the limit of its driving movement and starts to return, said disk 21 slides back to bring into a central position the cam faces of parts 20 and 21 and release the engagement between parts 21 and 22.

Friction shoes 74 (Fig. 2) are mounted on either end of a bar 75 supported on a pin 76 which in turn is supported on a spring 77, one end of which is mounted on a pin 78 projecting inwardly from the casing A, the other end of which is mounted on a pin on the inner end of an adjusting screw 79 whereby the tension of the spring may be regulated. Said shoes 74 bear on the periphery of each of the disks 21 with sufficient force to retard their rotation during the period of their freedom from positive locking to the shafts 19, thereby insuring a quick longitudinal movement under operation of cam 20 to engage with the friction faces of the disk 22.

Each of the sliding rods 68 is formed with an annular groove 80 in its projecting outer end. Notches in the respective outer ends of arms 81, which extending radially from a sliding collar 82, engage said grooves. Said collar 82 is mounted to slide longitudinally on the projecting end of the bearing $a^8$ of driven shaft 11 and is engaged on opposite sides by pins projecting inwardly from branches of a shifting fork 83. Said shifting fork is formed on one end of a rock shaft 84 mounted in bearings formed in lugs 85 and 86 on the head $A^1$ of the casing. A short lever 87 is secured to said shaft 84 and connected by a link 88 with one end of a lever 89 which is mounted at an intermediate point on a rock-shaft 90 mounted in bearings in brackets 91 on the exterior of casing A. Said shaft 90 extends to the other end of casing A (see Fig. 8), and a slotted lever 92 is mounted on the opposite end thereof having a slot of the form best shown in Fig. 7, with a central upper portion having parallel sides and a lower portion the sides of which are flared outwardly each way from said central portion. A foot lever 93 mounted on a pivot 94 has a projecting end beyond its pivot on which is mounted an anti-friction roller 95 which operates in said slot in lever 92 and when in position in the upper end of said slot holds rock shaft 90, through the connection above described, in position to secure the sliding rods 68 with their cam surfaces, in the position indicated in Figs. 20 and 21, or with the disk 21 locked against oscillating in either direction independent of shaft 19 and thus with the interengaging friction faces of disks 21 and 22 out of operative engagement and the driven shaft 11 at rest. When lever 92 is brought to this position by the forcing of roller 95 into the upper end of the slot therein a spring pawl 96 engages with a notch in the under edge of said lever and locks the parts in this position. A spring 97 attached to the outer end of the lever 93 at one end and at the other end to a pin projecting from the side of casing 98 serves to throw said lever 93 back to its normal position with the roller 95 in the wide portion of said slot. On the lower end of lever 92 is formed a double faced cam 99 against which an anti-friction roller 100 on the upper end of a spring pressed plunger 101 is adapted to bear. Said plunger normally is in the position shown in Fig. 7 adapted to operate on the cam face to throw the lever rearwardly and rock the shaft 90 in that direction to operate the rods 68 to release disks 21 so that they will engage with the disks 22 to operate the mechanism in a forward direction. Lever 93 carries an arm 102 with a hook-shaped lower end adapted to engage with the upper end of lever 43 and operate said lever when roller 95 is thrown into position to center said lever 92. As said lever 43 is thrown forward by said lever 93 it operates to throw on the appropriate band-brake 36 or 37 and lock the appropriate wheel 34 or 35 to operate the shaft 27 to run the crank-pin 14 to a position concentric with the driving shaft 10 and bring the pitman disk C to a stationary position, when the parts are ready for starting.

The outer end of lever 89 on rock shaft 90 is engaged by the inner end of a lever 103 pivoted to a hanger 140. The opposite end of said lever is pivoted to a push rod 104 which extends up near the seat of the machine in convenient position to be operated. When it is desired to reverse the motion of the car the operator presses on said push rod 104 which rocks shaft 90 reversely to its normal operation before described, and forces rods 68 to the position which will lock disks 21 out of engagement with disks 22 during the forward stroke of the oscillating shafts 19, but permit a sufficient independent oscillation on said shafts to allow them to move into engagement with disks 22 on the back strokes of said shafts, thus reversing the motion of the driven shaft and the motion of the vehicle.

105 represents the emergency brake operating lever of the car mounted on a rock-shaft 106, which is connected to the emergency brake operating mechanism (not shown). Said rock-shaft carries a segment 107 with ratchet teeth on its edge with which a pivoted pawl 108 is adapted to engage. Said pawl is mounted on a pivot 109 and has a projecting wing 110 below said pivot. A spring 112 is interposed between said wing and a lug 111 which normally holds said pawl into engagement with said toothed segment and serves to lock the emergency brake on when operated by said lever 105.

An arm 113 (Fig. 8) extends downwardly from shaft 106 and has a rod 114 pivoted to the lower end thereof which rod is adapted to slide through a perforation in a lug 115 on the frame of the machine. A spring 116 is mounted thereon interposed between an adjustable collar 117 and said lug 115, the tension of said spring being normally exerted to throw said emergency brake off as soon as the engagement of pawl 108 is released from engagement with the toothed segment 107. A connecting rod 118 is pivoted at one end near the upper end of said segment 107 and at the other end is connected by a slot with a pin 119 on an arm 120 rigidly secured on the rock-shaft 94 on which lever 93 is mounted. The connection between the outer end of the slot in said rod 118 and pin 119 is such that when the emergency brake is thrown on the same motion will operate to rock said shaft 94 to throw the roller 95 into central position in the upper end of the slot in lever 92, which operates to bring rock-shaft 90 to a central position and lock disk 21 out of operative engagement with disk 22 and, at the same time, through the connection with lever 43, before described, operates said lever and, through the mechanism connected to be operated thereby, operates the speed varying mechanism to run the crank-pin down to "no-throw" position. Thus only the one lever 105 need be operated to bring the car to a quick stop through the medium of the emergency brake, the same motion of the same lever also operating the mechanism to stop the motion of the driven shaft and also to run the driving mechanism down to zero.

A short rock-shaft 121 is mounted in the casing B having an eccentric, or crank-pin 122 projecting inwardly and engaging between the flanges of sliding ring 59 on housing 13. On the outer end of said rock-shaft 121 is mounted a collar 123 having a projecting arm 124 which engages with a notch 125 in the side of spring-pawl 96. Said collar 123 is mounted on said rock shaft 121 by means of set screws 126 and 127 engaging with loosely fitting tangential grooves in opposite sides of said shaft, whereby by the relative adjustment of said screws, that is, by backing one screw and advancing the other, the position of the arm 124 may be regulated to time the operation as desired. The eccentric 122 is so positioned that when ring 59 is moved by rock-shaft 55 and connected parts when the varying mechanism runs down, it will at the same time operate to withdraw pawl 96 from engagement with lever 92 and permit spring plunger 101 to set the driving mechanism for forward motion.

In order to provide for the automatic release of the brake on the starting of the car I provide a segmental rack on nut 26 on one of the shafts 19 with which a rod 128 having teeth in one side is adapted to engage. A push-rod 129 is mounted in a lug 130 alongside the segment 107 with its forward end resting in a lug 131 on the side of pawl 108 and adapted to bear against the side of a sliding rod 132 mounted in lugs 133 and 134 integral with said pawl 108. It will be seen that as soon as the shaft 19 begins oscillating under the impulse from the engine rod 128 will slide back and forth in its bearing. The adjacent ends of rods 128 and 129 are formed with tapered abutting faces, so that as rod 128 slides outward it pushes said rod 129 forward against the rod 132 and throws pawl 108 out of engagement with said segment and automatically releases the emergency brake. The rods 128 and 129 are so adjusted in relation to each other that their normal position will be as shown in Fig. 15 when the shafts 19 are at rest. Should the engine or car stop before the gear runs down to "no-throw" position and the rod 128 be across the end of rod 129, pawl 108 may be left engaged with the segment 107 by lifting rod 132 so that notch 135 in the side thereof will be opposite the end of said rod 129, thus permitting the engagement of said segment notwithstanding rod 128 is holding said rod 129 in its forward position. It will also be noted that a slot 136 is formed in the floor of the car through which the upper end of rod 132 extends which enables the said rod to tilt forward either under the impulse of rod 129, or by manual operation, as with the foot, to throw pawl 108 out of engagement with segment 107 and release the brake whenever it may be desired to do so, as when it is desired to move the car with the engine at rest.

By referring to Figs. 8, 16, and 36, the means for operating the speed varying mechanism will be seen. In Fig. 36 is shown a portion of the steering wheel 145 on the steering shaft 146. On one side of said shaft is journaled a second shaft 147 which runs parallel thereto and extends through a bearing in the bottom of the car 148 and is provided with a crank-arm 149 on its lower end. The other end of said crank-arm is connected by a connecting-rod 150 to the upper end of lever 43. A hand lever 151 is mounted on the upper end of said shaft 147 with its outer end within convenient reach of the hand of the operator while handling the steering wheel 145. As will be readily seen by turning lever 151 in either direction, which can be done by the operator reaching down with one finger or thumb from the hand resting upon the hand wheel 145, shaft 147 will be turned correspondingly and, through the connection before described, lever 43 will be operated, and, through the connections therewith, bandbrake 36 or 37 will be operated to hold either wheel 34 or 35 from rotation, and thus operate the mechanism which varies the throw of the crank-pin 14 and, consequently, the speed of the driven shaft and the speed of the machine. It will thus be seen that by moving said lever 151 in the appropriate direction either brake desired may be brought into action and the speed quickly, but gradually, changed in either direction.

The operation of my said invention may be recapitulated as follows: The parts being in operative position and set for forward motion, the engine is started and the operator, through the medium of the lever 151 just described and the mechanism controlled thereby, moves the crank-pin 14 from a position concentric with the engine shaft 10 outwardly. The "throw" of said crank-pin is first but slight and the oscillation of the shafts 19 correspondingly slight, starting the car forward in an easy manner, free from jerks, shocks, or undue strain. The gradual movement of the crank-pin outwardly increases the throw of the pitman disk C and consequently the oscillation of the shafts 19 and increases the speed of the car in a gradual and continuous manner until the speed desired is attained. The friction disk 21 is set, by the mechanism before described, to operate the driving mechanism in a forward or backward direction according to the desire of the operator.

By this means a transmission gear is provided by which the power may be transmitted from the engine shaft to the driven shaft positively at all speeds and the speed changed gradually and continuously from "no motion" to the highest speed desired, and back, without shock or sudden strain; the mechanism is always ready for starting because it automatically runs down to starting position when the car is brought to a stop, whether through the medium of the emergency brake or the other stopping mechanism. The mechanism is entirely inclosed in a dust proof oil containing casing and is thus not only well protected from undue wear, but is adapted to run with comparatively slight noise and friction.

In Figs. 8 and 16 the mechanism is shown as applied to a car mounted between longitudinal supporting beams 155 carried in a suitable manner between the side beams 156 of the car body. It will be understood, however, that the mounting of the gear and casing upon any car will depend very largely for detail upon the type of car with which it is to be used.

Having thus fully described my said invention, what I claim as new, and desire to secure by Letters Patent is:

1. A variable speed gearing comprising a driving shaft, a variable-throw crank carried thereby, oscillating crank-shafts, means establishing a driving connection from said variable-throw crank to said oscillating shafts, gears loosely mounted on said oscillating shafts, a driven shaft, a gear fixed upon said driven shaft and meshing with said loose gears on said oscillating shafts; a pair of frictional clutch parts mounted on each of said oscillating shafts one secured to the gear wheel and the other loosely mounted on said shaft for lateral movement, and means carried on said oscillating crank-shaft by which the engagement of said clutch parts may be controlled, substantially as set forth.

2. A variable speed gearing comprising a driving shaft, a variable-throw crank mounted thereon, oscillating crank-shafts, driving means between said variable-throw crank and said oscillating crank-shafts, gears loosely mounted on said oscillating crank-shafts, means for frictionally engaging said gears and oscillating shafts, means for controlling said engagement operated by the power transmitted, a driven shaft, and a gear on said driven shaft connecting with said gears on said oscillating shafts, substantially as set forth.

3. A variable speed gearing comprising a driving shaft, a variable-throw crank connected to be driven thereby, oscillating crank-shafts, means for operatively connecting said variable-throw crank and said oscillating crank-shafts, gears loosely mounted on said oscillating crank-shafts, means for frictionally engaging said oscillating crank-shafts to said gears, means operated by the power transmitted from the driving shaft for effecting said frictional engagement in either direction, and a driven shaft connected to be driven from said gear, substantially as set forth.

4. In a variable speed gearing of the type described, variable oscillating shafts, gears mounted loosely on said shafts, frictional means for engaging said gears to said shafts in one direction and free them from such engagement in the opposite direction, means operated by the power transmitted for controlling said engagement, and means for changing the engagement to reverse the motion, substantially as set forth.

5. A variable speed gearing comprising a driving shaft, a variable-throw crank operated thereby, oscillating crank-shafts, a pitman disk connecting the cranks thereof to said variable-throw crank, said disk having an annular groove with segmental blocks or boxes therein mounted upon the crank-pins of said oscillating crank-shafts, gears loosely mounted on said oscillating shafts, frictional clutches for engaging said oscillating shafts with said gears, means for effecting the frictional engagement automatically when said shafts oscillate in one direction and free them when they oscillate in the opposite direction, means for changing such engagement to reverse the motion, and a driven shaft geared to said gears on said oscillating shafts, substantially as set forth.

6. A variable speed gearing comprising a driving shaft, variably oscillating shafts, means for operating the same from said driving shaft, gears loosely mounted on said oscillating shafts, frictional clutch members secured to the gears, other frictional clutch members mounted on the oscillating shafts and fitted to engage with the members on the gears, said members on the shafts being mounted to have lateral independent motion, a cam mounted in said oscillating shaft and adapted to control said lateral motion, and a driven shaft geared to the gears on said oscillating shaft, substantially as set forth.

7. A variable speed gearing comprising a driving shaft, variably oscillating shafts connected to be driven thereby, a driven shaft, gears loosely mounted on said oscillating shafts and meshing with a gear on said driven shaft, a frictional clutch member secured to each of said gears, another frictional clutch member mounted on each of said shafts alongside of said other clutch member and adapted to frictionally engage therewith and to have an independent lateral motion, radially sliding pins mounted in said oscillating shafts and engaging with recesses in the hub of said laterally moving friction member, a sliding rod with cam faces mounted in each of said oscillating shafts and passing between the adjacent ends of said pins for operating them, and means for operating said rods, substantially as set forth.

8. A variable speed gearing comprising a driving shaft, a driven shaft, connecting gearing including variable oscillating shafts, gears loosely mounted on said oscillating shafts, frictional clutch members secured to said gears, corresponding frictional clutch members on the oscillating shafts secured to have an independent motion, cams connected to slide said clutch members into engagement with the members secured to the gears, means for reversing the engagement of said frictional members, and means for controlling the same through the interior of said oscillating shafts, substantially as set forth.

9. A variable speed mechanism comprising oscillating shafts, gears loosely mounted thereon, friction means for engaging said gears with said shafts, means for controlling said friction means to engage in either direction of the motion of said oscillating shafts and release on the opposite motion, and means for controlling said means through the interior of said oscillating shafts, substantially as set forth.

10. A variable speed mechanism comprising oscillating shafts, means for operating the same, gears loosely mounted thereon, means for frictionally engaging said gears and said shafts when said shafts are oscillated in one direction and free them when oscillated in the opposite direction, pins mounted to slide in radial apertures in said shafts and adapted to engage with one part of said friction operating means to regulate its motion independent of the oscillating shaft, a rod mounted to slide in said oscillating shaft and provided with cam faces between the ends of said pins, means for operating said rods whereby said pins may be engaged with said part to control its movement independent of the oscillating shaft and the motion of the driven part, and a driven shaft connected with the gears on said oscillating shafts, substantially as set forth.

11. A variable speed gearing comprising oscillating shafts having loosely mounted gears thereon, automatically acting friction clutch mechanism by which said gears may be clutched to said shafts to be driven in either direction, means for driving said shafts, means for controlling the direction of motion of said gears, a driven shaft, and a gear thereon engaging with the gears on said oscillating shaft, substantially as set forth.

12. A variable speed gearing comprising oscillating shafts, loosely mounted gears thereon, clutch mechanism by which said gears may be engaged with said oscillating shafts to drive in either direction, means for controlling said direction of motion comprising a rod mounted in the interior of said oscillating shafts and engaging pins in lateral perforations adapted to be moved laterally by cam faces on said rods, and a driven shaft geared to the gears on said oscillating shafts, substantially as set forth.

13. A variable speed mechanism comprising oscillating shafts, gears loosely mounted thereon, a driven shaft, a gear on said driven shaft meshing with said gears on said oscillating shafts, clutch mechanism for engaging said loosely mounted gears to said oscillating shafts, means for operating said clutch mechanism to drive in either direction comprising sliding pins mounted in radial perforations in said shaft engaging at their outer ends with a part of said clutch mechanism, and a rod extending longitudinally in said shaft with its inner end formed with cam faces which rest between the adjacent ends of said pins, and means for operating said rods, substantially as set forth.

14. A variable speed mechanism comprising oscillating shafts having gears loosely mounted thereon, clutching members one secured to the gear on each oscillating shaft and the other mounted to move laterally thereon, a pin mounted in a radial perforation in said shaft and adapted to engage with each clutch part on said shafts, a rod in a longitudinal perforation in each of said shafts formed to operate said pins, and means for operating said rods simultaneously, whereby the motion of said gears may be controlled, substantially as set forth.

15. A variable speed mechanism comprising oscillating shafts, means for driving the same, gears loosely mounted thereon, automatically acting frictional clutch members one secured to each gear and another mounted alongside thereof on each oscillating shaft, said clutch members being adapted to engage each other by pressure automatically, means for controlling the action of said frictional clutch members to drive the gear in either direction, and a driven shaft geared to said gears on said oscillating shaft, substantially as set forth.

16. A variable speed mechanism comprising a driving shaft, a driven shaft, connecting gearing including oscillating shafts, gears loosely mounted thereon, a clutch member secured to each gear, another clutch member loosely secured for lateral movement on each oscillating shaft alongside each gear and connected for oscillating movement with said shaft in either direction, and means for sliding said laterally moving members automatically into and out of driving engagement with the members attached to the gears, and a driven shaft connected with said gears, substantially as set forth.

17. A change speed mechanism comprising a centrally arranged driven shaft, series of oscillating shafts arranged around said driven shaft, means for driving said oscillating shafts, gears loosely mounted on said oscillating shafts, a gear on said driven shaft engaging with said gears on said oscillating shafts, frictional clutch members on each of said oscillating shafts one member secured to the loosely mounted gears and the other member mounted to have a limited longitudinal and rocking movement on the oscillating shaft and formed with a cam face, cams rigidly secured to said oscillating shafts having a correspondingly formed engaging cam face, pins with tapered outer ends mounted in each of said oscillating shafts engaging with corresponding tapered notches in the hubs of the friction members thereon, which notches are somewhat wider than the engaging ends of said pins, means for adjusting said pins radially, and means for regulating and supporting them in adjusted position, whereby said member may be allowed to rock independently of its shaft in one or the other direction and be thus allowed to slide into and out of engagement with the clutch member on the gear in whichever direction of motion of the shaft may be desired, substantially as set forth.

18. A variable speed mechanism comprising a driving shaft, oscillating shafts operatively connected thereto, gears loosely mounted on said shafts, a driven shaft, a gear thereon engaging with the gears on said oscillating shafts, clutching members adapted to engage each other by the power transmitted, and means arranged to operate said clutch to couple said loosely mounted gears to said oscillating shafts when moved in one direction and to uncouple them when moved in the other direction, substantially as set forth.

19. A variable speed mechanism comprising oscillating shafts, gears loosely mounted thereon, a driven shaft, a gear on said driven shaft engaging with said gears on said oscillating shafts, clutch members, one secured to each of said loosely mounted gears and another mounted on each of said oscillating shafts to have a limited longitudinal and rocking movement, a wedge-shaped cam on each of said shafts adapted to force said clutch member into engagement with the clutch member on the gear when the shaft is rocked in one direction and to permit it to disengage when it is rocked in the other direction, cross pins mounted in a cross perforation in said shaft engaging said clutch member to control the direction of its rocking movement, and means for operating said pins, substantially as set forth.

20. A variable speed gearing comprising a driving shaft, a variable-throw crank-pin mounted on said shaft, means for sliding said crank-pin in relation to the axis of said driven shaft, a pitman disk on said crank-pin, a series of sliding blocks mounted in a circular groove in the face of said pitman disk, a series of oscillating shafts arranged in a circle and connected by cranks to said blocks, a centrally mounted driven shaft, and a driving connection between said driven shaft and said oscillating shaft, substantially as set forth.

21. A variable speed mechanism comprising a driving shaft, a housing carried by said driving shaft formed with a transverse way, a crank-pin mounted to slide in said way, a gearing for sliding said crank-pin connected to be operated by the motion of said driving shaft, means for changing the direction of motion of said gearing, a pitman disk on said crank-pin, oscillating shafts connected with said pitman disk, and a driven shaft geared to said oscillating shaft, substantially as set forth.

22. A variable speed mechanism comprising a driving shaft, a housing carried thereby, a crank-pin mounted to slide in said housing in relation to the axis of said driving shaft, gearing for sliding said crank-pin connected to be operated in either direction including a pair of wheels mounted around said housing and connected to said gearing, one to drive it in one direction and the other to drive it in the other direction, means for holding either of said wheels to operate at will, a pitman disk on said crank-pin, oscillating crank shafts connected to said pitman disk, and a driven shaft geared to said oscillating shafts, substantially as set forth.

23. A variable speed mechanism comprising a driving shaft, a variable-throw crank pin carried by said driving shaft, means for varying the throw of said crank pin, means for controlling the vary of the crank pin, a driven shaft, a brake for normally holding the driven shaft, means for releasing said brake when the crank pin is moved concentric with the driving shaft, and a train of gearing connecting the driving shaft with said variable-throw crank pin, substantially as set forth.

24. A variable speed mechanism comprising a driving shaft, a variable-throw crank-pin carried thereby, gearing for moving said crank-pin to or away from a position concentric with the axis of said driving shaft, whereby the throw of said crank-pin is increased or diminished, means for automatically running said crank-pin down to the concentric position when the car is stopped, and means for controlling the motion of said gearing in either direction when the car is in motion, substantially as set forth.

25. A variable speed mechanism comprising a driving shaft, a housing thereon, a sliding crank-pin in said housing, two friction wheels mounted on said housing with internal gear teeth, two shafts mounted in said housing having gears engaging each other and the gear on one shaft engaging one friction wheel and that on the other shaft engaging the other friction wheel, a screw engaging said crank-pin for moving it in either direction, a gear on said screw, a worm on one of said shafts engaging said gear, friction band brakes surrounding each of said friction wheels, means for setting either brake at will, a driven shaft, and a train of gearing operated by said crank-pin connected with said driven shaft, substantially as set forth.

26. A variable speed gear comprising oscillating shafts each having a crank on one end thereof, driving mechanism connected with said cranks, a gear loosely mounted on each of said oscillating shafts, friction members on said oscillating shafts, one on the gear and the other arranged to have a limited free movement on the shaft, a cam secured to each shaft adapted to operate said free member into and out of engagement with the member on the gear, a driven shaft geared to said gears on said oscillating shaft and means for controlling the movement of said free clutch member whereby it may be made to engage with the other member in whichever direction of oscillation desired, or remain out of engagement, substantially as set forth.

27. A variable speed mechanism comprising a driving shaft, a driven shaft, gearing connecting said driving shaft with said driven shaft including a series of oscillating shafts having clutch members arranged to clutch and unclutch at the limit of each oscillatory movement, one of said clutch members being mounted to have a limited free movement longitudinally of its shaft, a cam for operating said free member, means for rendering said free member active or inactive, and means for controlling said last mentioned means extending through each shaft to the outer end thereof, substantially as set forth.

28. A variable speed mechanism comprising a driving shaft, a variable-throw crank-pin carried thereby, means for varying the throw of said crank-pin gradually and continuously in either direction at will, oscillating shafts operatively connected to said crank-pin, a driven shaft, a gear fast on said driven shaft, a gear mounted loosely on each of said oscillating shafts and meshing with the gear on said driven shaft, clutch members for coupling said gear to and uncoupling it from said oscillating shaft at will at either direction, and means for controlling the several mechanisms substantially as set forth.

In witness whereof, I have hereunto set my hand and seal at Washington, District of Columbia, this thirteenth day of May, A. D. nineteen hundred and thirteen.

ABRAHAM B. LANDIS. [L. S.]

Witnesses:
E. W. BRADFORD,
J. D. YOAKLEY.